May 21, 1963　　　　　M. ASRICAN　　　　　3,090,137
TEACHING AID APPARATUS
Filed Dec. 7, 1961　　　　　　　　　　　3 Sheets-Sheet 1
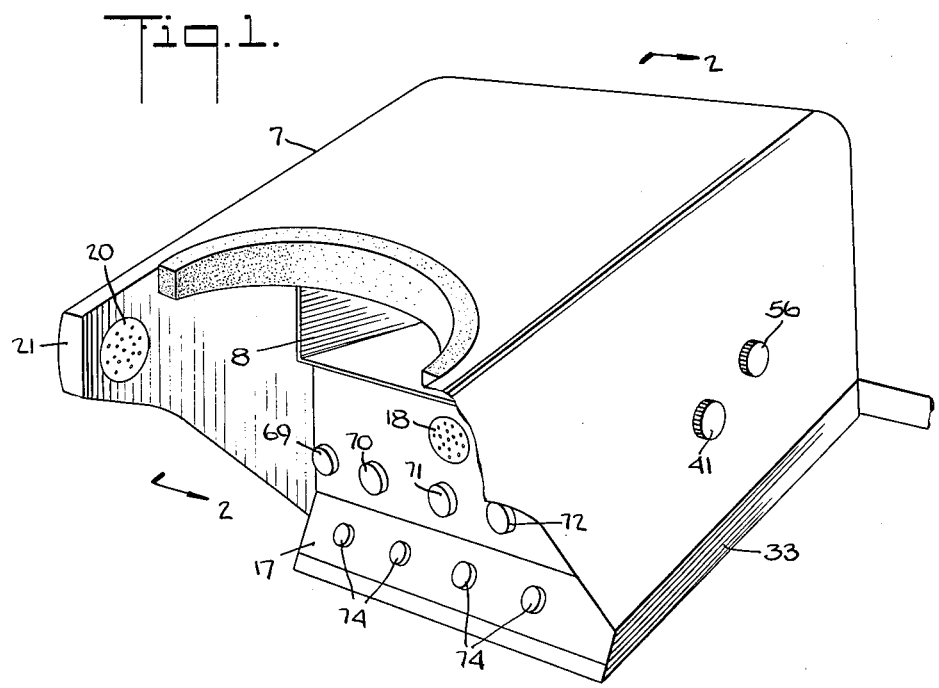
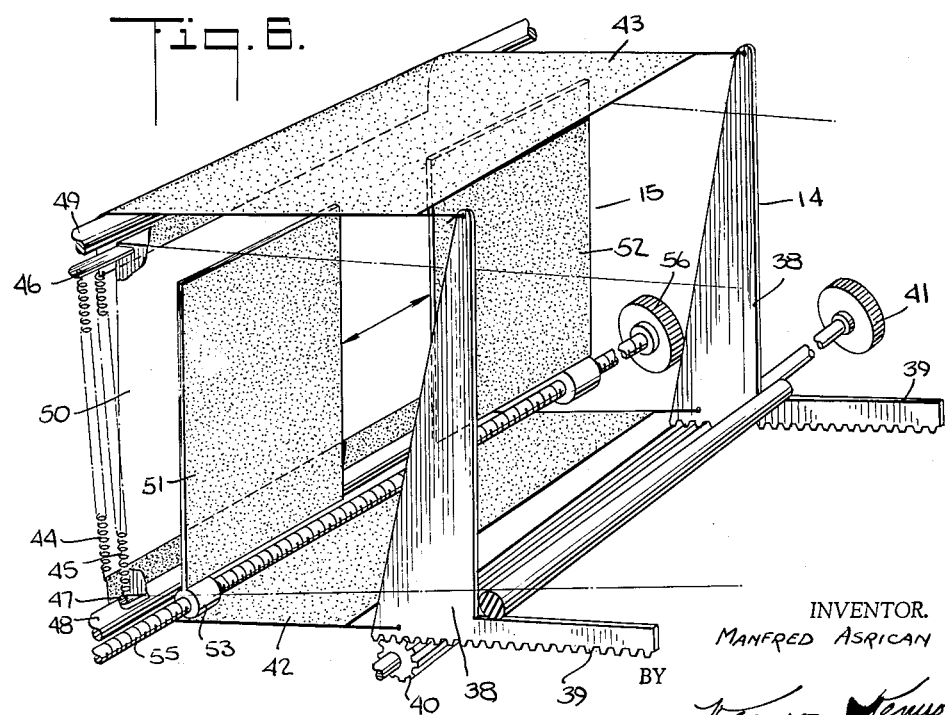
INVENTOR.
MANFRED ASRICAN
BY
ATTORNEYS

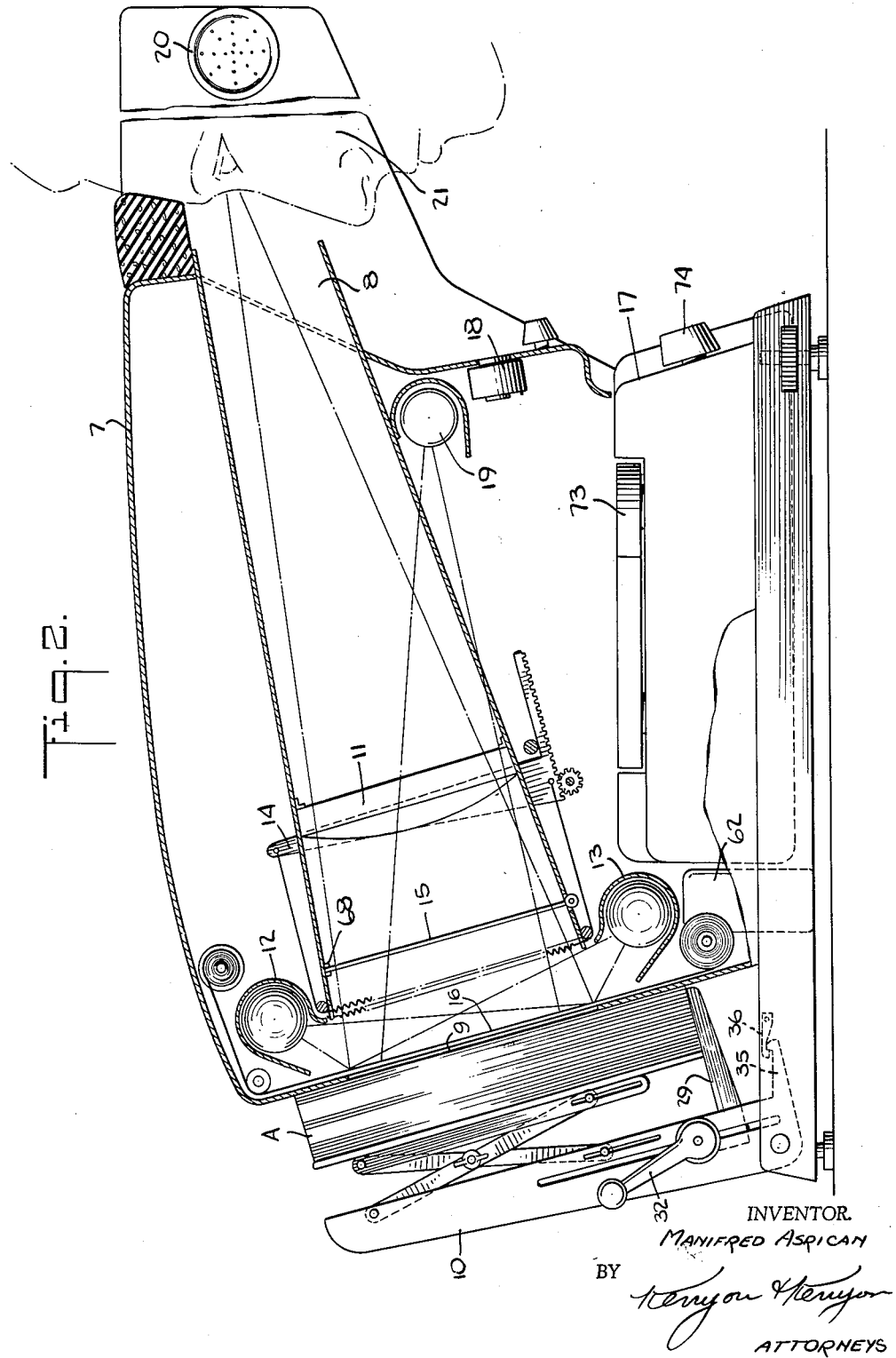

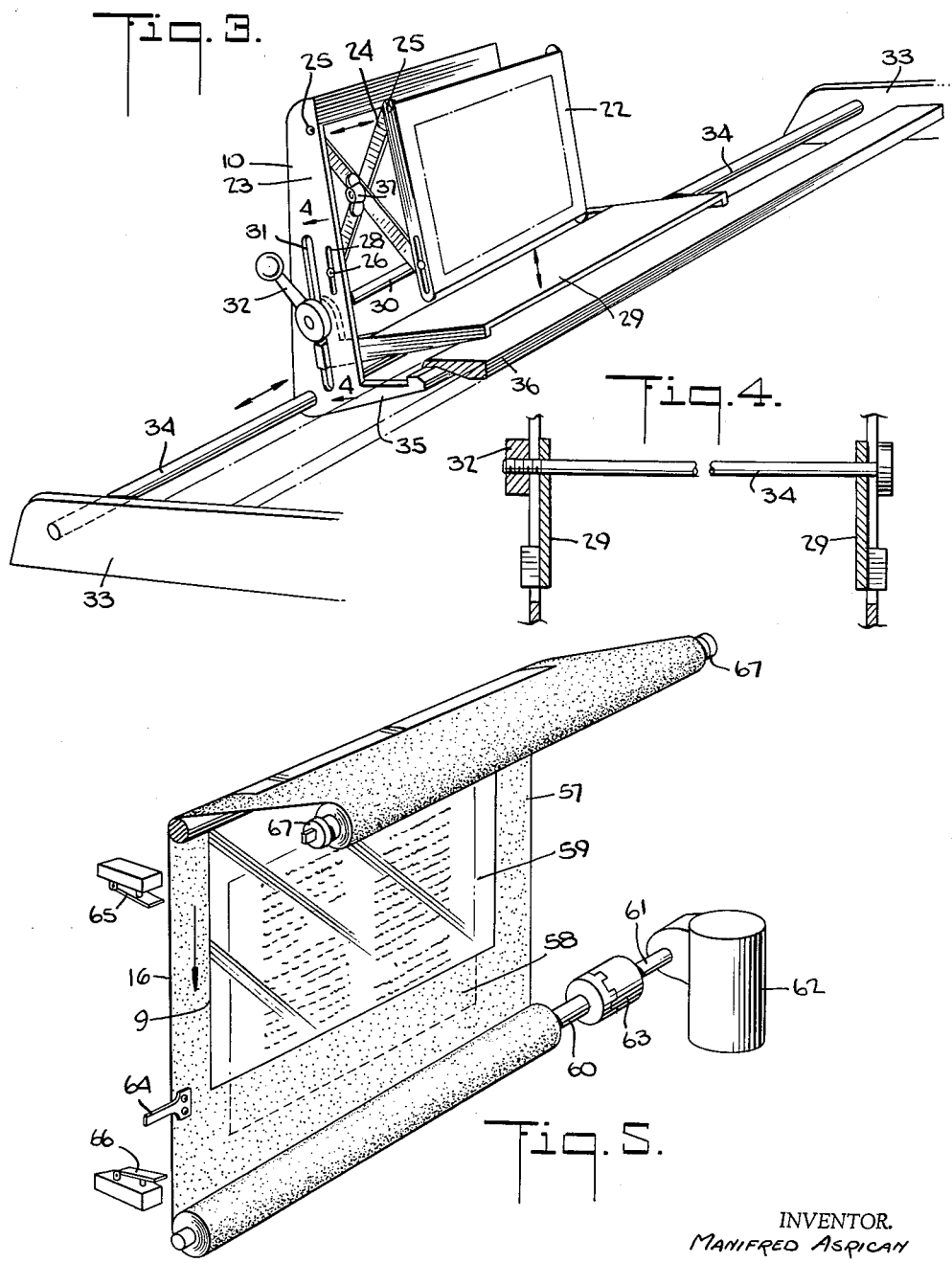

United States Patent Office 3,090,137
Patented May 21, 1963

3,090,137
TEACHING AID APPARATUS
Manfred Asrican, Stamford, Conn., assignor to International Teaching Machine Corporation, New York, N.Y., a corporation of Delaware
Filed Dec. 7, 1961, Ser. No. 157,691
19 Claims. (Cl. 35—35)

The present invention relates to teaching devices and, more particularly, to a device for aiding the student in concentrating on particular written matter such as books and the like.

It is becoming increasingly difficult for students in any area of study to assimilate even the most basic material or data required of him. He is continually faced with an ever-expanding mass of information and a limited time for accomplishing his task. Moreover, no matter what time pressures there are in accumulating this growth in knowledge, there has always existed the difficulty in concentrating on the matter to be assimilated.

The present invention has been conceived to help overcome these difficulties by presenting the subject reading matter in an atmosphere conducive to complete concentration thus decreasing the learning time required for any subject matter and thereby increasing the total knowledge capable of being learned in a limited time. The process of memorizing or learning written material, especially difficult material such as foreign languages and scientific data, can be helped considerably by eliminating or diminishing extraneous sensory disturbances by repeated and rapid exposure to the subject matter, and by reading written material coincidentally with a sound reproduction of the same matter. Also, by exposing the subject matter to the student at a selected rate, not only is the student capable of devoting more concentration on the particular matter exposed, but he may measurably increase his reading speed. Consequently, it is an object of the invention to provide a device whereby reading matter may be presented in a non-distracting environment.

It is an object of the invention to provide a teaching aid capable of presenting a selected or limited text before the reader.

It is a further object of the invention to provide a device for aiding a student in memorizing written material by repeated and rapid exposure to the material.

Still another object of the invention is to permit a student or reader to repeatedly listen, without distraction, to his own voice reading out loud as he coincidentally silently reads the same material, thus helping him memorize the material.

Yet another object of the invention is to provide an inexpensive and effective teaching aid capable of being placed on an ordinary desk and capable or presenting ordinary written matter from books and the like in such a manner that the operator's concentration powers are fully utilized.

Other objects and advantages of the invention will become apparent, or be pointed out further, in the description to follow.

The following figures illustrate a preferred embodiment.

In the drawings,

FIG. 1 is a perspective view of an apparatus according to the invention;

FIG. 2 is a plan view, partially in section, of a preferred embodiment of the invention;

FIG. 3 is a perspective view of a preferred apparatus for holding and adjusting the written matter to be viewed;

FIG. 4 is a sectional view of a vertical adjusting mechanism for a holder taken along lines 4—4 of FIG. 3;

FIG. 5 is a perspective view of a preferred blind apparatus for progressively exposing the written matter to view, and FIG. 6 is a perspective view of a preferred blind apparatus for adjusting the vertical and horizontal boundaries of the viewable matter.

The preferred apparatus in FIG. 2 has an enclosure or housing 7 having a viewing port 8 therein. The viewing port 8 forms an open channel between the viewer and the viewing surface 9. In the preferred embodiment as shown, the viewing surface 9 is a transparent window, behind which the book A, or other reading matter to be viewed, is held in place by holder 10. The holder shown is a preferred type and is more fully discussed hereafter in connection with FIG. 3.

The reading matter is viewed through an optical system, and in the preferred embodiment of FIG. 2, the system has a magnifying lens 11 placed in the viewing port 8. Its location is determined, of course, by the proper focal length for normal vision in the particular viewing channel or port. Also, the reading matter is illuminated by means of companion lights 12 and 13. In this manner, the viewer gets properly lighted reading matter magnified for easy reading.

The total viewable matter may be limited by a vertically adjustable blind mechanism 14 and a horizontally adjustable blind mechanism 15. These blind mechanisms are placed in the path of the line of vision defined by port 8. They will be described more fully in connection with FIG. 6.

A movable or scanning blind mechanism 16 is also located in the line of vision. This blind apparatus is capable of progressively and continuously exposing to view successive lines of the viewable material, and it is more fully described in connection with FIG. 5.

The preferred apparatus has a conventional tape recorder 17 preferably located in the chassis of enclosure 7 as shown. The tape recorder 17 will, upon appropriate signal, record matter read aloud into microphone 18. The tape recorder 17 may slide out of enclosure 7 for changing of tape 73 and repairs. The recorder 17 also contains separate controls 74 and the conventional sound reproducing playback mechanism as an integral part thereof and which is acuated upon a given signal. It is preferable in an apparatus of the type here described, that the sound reproducing mechanism have earphones 20 rather than the conventional loud speaker. These may conveniently be built into ear-like extensions 21 of the enclosure 7 adjacent to the normal location of the viewer's ears. Earphones cut down on the distraction of extraneous and outside noises, thereby permitting increased concentration on the matter being played back.

The apparatus may have a hypnotic light projector 19 which continuously projects a faintly visible rotating pattern upon the viewing surface or window 9. Such patterns, particularly continually rotating spirals, focus attention upon the surface where they are projected, but are not so bold as to detract from the main written matter on the viewing surface. The hypnotic light projector may be a conventional but small projector having a motor driven circular disc with the pattern cut into it placed in the light path. Some psychologists prefer the light pattern to be slightly tinted. This projector 19 may be located either above or below (as shown) the viewing port 8 and projects the pattern through an opening in the walls of the port.

In FIG. 3, the preferred holding apparatus 10 is shown in more detail. A compression surface 22 is extendably connected to a carriage 23 by means of expansion arms 24 which are attached to top pins 25 and slot-engaged bottom pins 26. The slots 28 permit the bottom pins to freely ride up and down as the expansion arms are moved forward and back, respectively. Loose pages of written matter may be attached to the compression surface 22 by simple spring clips or clamps (not shown). Books or other material rest on platform 29 which is attached to the sides of carriage 23 by means of bolt 30 to which the platform 29 is fixed at both ends. The bolt 30 rides in vertical slots 31 in the sides of the carriage 23 and is rigidly fixed at any desired height by means of a lever nut 32. Consequently the platform 29 is capable of vertical adjustment so as to align the reading matter of the book or other matter with window 9 of the main enclosure 7. Carriage 23 is attached to enclosure base members 33 by means of shaft 34 which passes through the sides of the carriage 23 and is rigidly fixed to the enclosure base members 33. The carriage 23 rotates freely about shaft 34 and is held in the upright position by means of a tongue member 35 which slidably engages corresponding grooved member 36. The connection between grooved member 36, which is attached to the enclosure base members 33 and the tongue member 35 permits the holder to be adjusted horizontally. Thus, when the book is placed upon the platform 29, the holder may be adjusted both vertically and horizontally to align the selected reading matter with the viewing surface or window 9. The book is then pressed against the window by the extendable compression surface 22 which is locked in place by wing nut 37. The grooved member 36 may, if desired, be rotatably pinned to the enclosure base member 33 so as to permit the carriage 23 to be disengaged from the grooved member 36. The carriage 23 could then be rotated to a horizontal position for easy cleaning, repairs, or for easier loading of unusual sized volumes.

In FIG. 6 is shown the preferred vertical and horizontal blind adjustments previously referred to. For the vertical adjustment, a rack and pinion mechanism is used. Rack grooves 39 of upright members 38 located in each side of the viewing channel or port 8 (see FIG. 2) engage pinion shaft 40, which is attached at one end to external manual control knob 41 and on the other end to the enclosure side wall. Flexible blinds 42 and 43 are each attached at one end thereof to the bottom and top respectively of upright members 38 and are each attached at the other end thereof to one end of springs 44 and 45 respectively. The other end of the springs 44 and 45 are fixedly attached to permanent members 46 and 47, respectively. As control knob 41 is turned forward, upright members 38 move forward and under action of the springs 44 and 45, the blinds 42 and 43 pass over free rotating shafts 48 and 49 and close off a corresponding amount of total viewing area 50. If desired, this vertical adjustment is capable of limiting the total viewable matter to a single line of print.

The preferred horizontal adjustment is accomplished by a conventional right hand-left hand screw mechanism. Rigid left-side blind 51 and right-side blind 52 are connected to a right and left hand threaded bolt 55 by attached cylindrical nuts 53 and 54 respectively. One end of threaded bolt 55 is connected to external manual turning knob 56 and the other end abuts inside a cup or indentation (not shown) on the inside of the enclosure 7. As the external knob 56 is turned the two blinds 51 and 52 approach each other or move away from each other along slide guide 68 (see FIG. 2), as the case may be. By proper utilization of both the vertical and horizontal adjustments, the total viewable matter may be limited to the specific column, passage, paragraph or line upon which the student wishes to concentrate.

The preferred movable or scanning blind mechanism 16 is depicted in FIG. 5. A flexible screen 57 has an opaque portion 58 located below a transparent portion 59 which is as large as the viewing window 9. The screen 57 is attached at the upper end to a spring roller 67, which operates on the same principle as a conventional spring operated window blind, except that it needs no locking mechanism. The screen 57 is attached at its lower end to a shaft 60 which is coupled to the shaft 61 of motor 62 through a clutch coupling 63. The motor 62 is preferably a conventional synchronous motor, the variable-speed output speed of which may be subject to selected variation. A less expensive arrangement could be obtained by using a constant speed motor with transmission gearing on the output shaft so as to obtain a selection of shaft speeds. This mechanism is widely used in common variable speed phonograph turn-tables.

The screen 57 has attached to it a contact point 64 which is used to hit limit switches 65 and 66. Limit switch 65 is operatively connected to the motor 62, so that when the contact point 64 touches switch 65 under action of the spring roller 67, the motor may be energized and drive the screen down against the action of the spring until contact point 64 hits limit switch 66, which turns the motor off and thus permits the spring roller 67 to disengage the clutch 63 and raise the screen until contact switch 64 hits limit switch 66 which may start another cycle. When the screen 57 is fully descended the transparent portion 59 has fully revealed the total viewable image. However, when the screen is fully raised, the blind portion 58 has completely covered the viewing surface or window 9. Consequently, it is seen that the activation of the motors permits the blind 58 to descend and progressively reveal successive lines of written matter through the transparent portion 59. The switches 65 and 66 also control other functions which will be described presently in connection with the operation of the device.

In FIG. 1 there is shown a control panel, preferably placed on the front side of the enclosure 7, upon which several controls are placed. For instance, control 69 may be an on-off switch which starts the recorder 17, places the motor 62 in circuit and starts the descent of the blind 58. Control 70 may be a standard stepping switch operatively connected to the motor 62 which permits the operator to select the number of cycles that the scanning blind mechanism makes. It is preferable to use a stepping switch which permits at least five cycles. It is possible, of course, to eliminate the selector switch and permit the scanning blind mechanism, and the related apparatus activated by the scanning blind mechanism, to cycle indefinitely. Control 71 may be used to initially turn on the illuminating lights 12 and 13, and to control their brightness. Control 72 may be used to turn on the hypnotic projector 19 and to control the brightness thereof. The recording mechanism 17, preferably the magnetic tape type, could have its own conventional set of controls, but it is in addition, operatively connected to limit switches 65 and 66 as is hereafter explained.

In a device of the type described, it is easier to understand the entire mechanism, and the purpose accomplished by it, by describing a typical operating process. Thus a typical operation of the preferred embodiment of this invention may be performed as follows:

After the book or reading matter has been placed in the holder 10 as previously described, the matter is presented on the viewing surface 9. If a particular paragraph is to be memorized or concentrated upon the manual control knobs 41 and 56 are turned to cause the vertical adjusting blinds 42, 43 and the horizontal adjusting blinds 51, 52 to limit the total viewable image to the particular paragraph. The illumination of the matter is adjusted by control 71 to suit the operator. When the motor is activated opaque scanning blind 58 continuously and progressively exposes successive lines of the written matter. The operator or student reads the matter out loud as it is revealed, and the matter is recorded by the recording mechanism 17 after being picked up by microphone 18. When contact point 64 on screen 57 contacts limit switch 66, the motor 62 turns off, the recording mechanism 17 stops and rewinds the magnetic tape 73, and illuminating lights 12 and 13 turn off. In the meantime, clutch 63 disengages and spring roller 67 raises the blind 58 until it completely covers the written matter again. At this point, contact point 64 trips limit switch 65, which simultaneously energizes motor 62, the playback mechanism (audio and tape) of recorder 17, and the illuminating lights 12 and 13. The blind 58 therefore starts a second descent and cycle, however, on this cycle, the operator silently reads the material as it is exposed to the blind and he simultaneously listens to the playback of the identical matter as it was recorded by him on the initial cycle. Thus the audio reproduction is coincidental with the visual exposure of the same matter by the descending blind. At the end of the second descent, the contact point 64 again hits limit switch 66 and again the illuminating lights and motor are shut off and the tape rewound. Switch 66 also is operatively connected to the audio portion of the recorder 17 so that the audio, if in the "on" position, is shut off by the closing of switch 66. Again the blind raises under action of the spring roller until it reaches its initial position as limited by hitting of contact point 64 with contact switch 65. At this point another cycle begins which is identical in all respects to the second or repeat cycle. The number of such playback or repeat cycles is determined, of course, by a stepping switch if such a switch is to be used.

The above operation describes a single utilization of the preferred embodiment, but it is evident that other procedures and equivalent features could be used without departing from the spirit of the invention. It is, for instance, within the contemplation of the invention that recording and sound reproducing systems other than the magnetic tape type could be used. Also presentation of written material on a surface such that the operator sees it in a magnified state may be accomplished by means of a projector, and the projector itself could be adapted to hold and project written matter from film strips, slides, and the like. Likewise, the vertically and horizontally adjustable blinds could operate on principles different from those described in the preferred embodiment. For example, these blind adjustments could be accomplished by simple rigid blinds movable in horizontal and vertical slide tracks.

I claim:

1. A teaching aid comprising, in combination, a viewing surface upon which written matter may be presented, means for presenting said written matter on said surface, blind means initially covering said written matter adapted to progressively expose to view successive lines thereof, means for recording matter read aloud by the viewer from said written matter exposed by said blind means, means for returning said blind means to its initial position, first control means for permitting said blind means to repeat its cycle one or more times, means for audibly reproducing said recorded matter, second control means for actuating said sound reproducing means at the same time as said blind means begins a repeat cycle, whereby the operator hears the recorded sound coincidentally with the exposure of the written matter corresponding thereto.

2. A teaching aid comprising, in combination, an enclosure with a viewing port therein, a viewing surface mounted in said enclosure upon which written matter may be presented, means for presenting said written matter on said surface, optical means for magnifying the viewable written matter, blind means initially covering said viewable written matter adapted to continually and progressively expose to view successive lines of the written matter constituting said image, means for recording matter read aloud by the viewer from said written matter exposed by said blind means, tension means for returning said blind means to its initial position, first control means for permitting said blind means to repeat its cycle one or more times, means for audibly reproducing said recorded matter, second control means for actuating said sound reproducing means at the same time as said blind means begins a repeat cycle, whereby the operator hears the recorded sound coincidentally with the exposure of the written matter corresponding thereto.

3. The teaching aid according to claim 2 in which the blind means comprises a flexible vertically adjustable blind operatively connected to a motor at one end thereof and operatively connected to a spring at the other end thereof, whereby the blind may be lowered by the motor and raised by the spring.

4. The teaching aid of claim 2, including, in addition, a projector within said enclosure adapted to continuously project a perceptible continuously rotating pattern on said viewing surface.

5. The teaching aid according to claim 2, including, in addition, means for changing the rate at which said blind means exposes said total image to view.

6. A teaching aid comprising, in combination, an enclosure with a viewing port therein, a viewing surface mounted in said enclosure upon which written matter may be presented, means for presenting said written matter on said surface, optical means for magnifying the viewable written matter, first blind means for limiting the total image visible through said viewing port, second blind means initially covering said total image for continually and progressively exposing to view successive lines of the written matter constituting said total image, means for recording audible matter read aloud by the viewer from the written matter exposed by said second blind means, tension means for returning said second blind means to its initial position, first control means for permitting said second blind means to repeat its cycle one or more times, means for reproducing said recorded matter, second control means for actuating said sound reproducing means at the same time as said second blind means begins a repeat cycle, whereby the operator hears the recorded sound coincidentally with the exposure of the written matter corresponding thereto.

7. The teaching aid according to claim 6 in which the first blind means comprises a horizontally adjustable blind, a vertically adjustable blind, and manual control for adjusting the said blinds to the desired position.

8. A teaching aid comprising, in combination, an enclosure having a viewing port and a window therein, means for holding written matter against the outside of said window, an optical system within said enclosure for permitting said written matter to be viewed through said viewing port, a scanning blind means initially covering the viewable matter for progressively exposing to view successive lines of said written matter at a desired rate, a sound recording means adapted to record the matter read aloud by the viewer as it is exposed by said scanning blind means, and means for audibly reproducing said recorded matter.

9. A teaching aid comprising, in combination, an enclosure with a transparent window therein, means for holding written matter against the outside of said window, a viewing port in said enclosure, an optical system within said enclosure for permitting said written matter to be viewed through said viewing port, a first blind means for limiting said written matter to a particular portion thereof, a second blind means initially covering the viewable matter for progressively exposing to view successive lines of said particular portion at a desired rate, a sound recording means adapted to record matter read aloud by the viewer from the written matter exposed to view by said second blind means, and means for audibly reproducing said recorded matter.

10. The teaching aid according to claim 9 in which the optical system comprises a magnifying lens between said window and said viewing port, and a light source illuminating said written matter held against said window.

11. A teaching aid comprising, in combination, an enclosure, a transparent window in one wall of said enclosure, means for holding written matter against the outside of said window, a viewing port in one wall of said enclosure, an optical system within said enclosure adapted to permit the written matter held against said window to be viewed through said viewing port, blind means initially covering said viewable matter adapted to progressively expose to view successive lines of total viewable matter, a sound recording means adapted to record matter read aloud by the viewer as it is exposed to view by said blind means, a tension means for returning said blind means to its initial position, a first control means for permitting said blind means to repeat its cycle one or more times, means for audibly reproducing said recorded matter, a second control means for actuating said sound reproducing means at the same time as said blind means starts a repeat cycle, whereby the operator hears the recorded matter coincidentally with the exposure of the written matter corresponding thereto.

12. The teaching aid of claim 11 including, in addition, a projector within said enclosure adapted to continuously project a perceptible continuously rotating pattern on said window.

13. The teaching aid according to claim 11 in which the optical system comprises a magnifying lens located between the window and the viewing port, and a light source directed to said windows.

14. A teaching aid comprising, in combination,
   (a) an enclosure,
   (b) a transparent window in one wall of said enclosure,
   (c) means for holding written matter against the outside of said window,
   (d) a viewing port in one wall of said enclosure,
   (e) an optical system within said enclosure adapted to permit the written matter held against said window to be viewed through said viewing port, a
   (f) scanning means for progressively exposing to view successive lines of the total viewable matter, comprising:
      (i) a flexible vertically adjustable blind,
      (ii) a motor operatively connected to said blind at one end thereof and adapted to lower said blind,
      (iii) a spring operatively connected to said blind at the other end thereof and adapted to raise said blind,
      (iv) first control means for automatically turning off said motor when said blind is fully descended,
      (v) a clutch means for permitting said spring to raise said blind when said motor is turned off, and
      (vi) second control means for automatically turning on said motor when said blind is fully raised by said spring, whereby said blind descends on a second cycle,
   (g) a sound recording means adapted to record matter read aloud by the viewer as it is exposed to view by said scanning means during its first cycle,
   (h) means for audibly reproducing said recorded matter,
   (i) switch means for automatically energizing said sound reproducing means as said scanning means starts its second cycle, whereby the viewer sees the written matter exposed by said scanning means coincidentally with the hearing of the recorded matter corresponding thereto, and
   (j) control means for repeating said second cycle of said scanning means one or more times.

15. The teaching aid of claim 14 including, in addition, a projector within said enclosure adapted to continuously project a perceptible continuously rotating pattern on said window.

16. The teaching aid according to claim 14 in which the motor of said scanning means is adapted to lower the blind at selectively different speeds.

17. The teaching aid according to claim 14 in which the sound recording means is the magnetic tape type.

18. The teaching aid according to claim 14 in which the optical system comprises a magnifying lens located between the window and the viewing port, and a light source directed at said window.

19. The teaching aid according to claim 14, including, in addition, a blind means for horizontally and vertically limiting the total viewable matter to a desired portion thereof.

References Cited in the file of this patent
UNITED STATES PATENTS

| 2,265,924 | Oerter | Dec. 9, 1941 |
| 2,662,306 | McMaster | Dec. 15, 1953 |
| 2,919,499 | Reynolds | Jan. 5, 1960 |
| 2,919,500 | Simpson | Jan. 5, 1960 |

OTHER REFERENCES

Brochure, "Rheem Califone Language Laboratory," May 1961, Rheem Califone Corporation, Los Angeles 16, Calif.